(12) United States Patent
Gudat et al.

(10) Patent No.: US 7,594,441 B2
(45) Date of Patent: Sep. 29, 2009

(54) AUTOMATED LOST LOAD RESPONSE SYSTEM

(75) Inventors: Adam John Gudat, Chillicothe, IL (US); Bradley Scott Kriel, Peoria, IL (US); Kenneth Lee Stratton, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 11/905,042

(22) Filed: Sep. 27, 2007

(65) Prior Publication Data

US 2009/0084173 A1    Apr. 2, 2009

(51) Int. Cl.
  *G01B 5/30* (2006.01)
  *E01C 23/00* (2006.01)
(52) U.S. Cl. .......................................... 73/760; 73/146
(58) Field of Classification Search .................. 73/760, 73/146, 800
  See application file for complete search history.

(56) References Cited

U.S. PATENT DOCUMENTS

| | | | |
|---|---|---|---|
| 5,018,698 A * | 5/1991 | Tobias | 248/550 |
| 5,044,820 A * | 9/1991 | Prang | 404/84.1 |
| 5,359,666 A * | 10/1994 | Nakayama et al. | 382/104 |
| 5,375,663 A | 12/1994 | Teach | |
| 5,414,625 A * | 5/1995 | Hattori | 701/27 |
| 5,548,516 A | 8/1996 | Gudat et al. | |
| 5,610,815 A | 3/1997 | Gudat et al. | |
| 5,631,658 A | 5/1997 | Gudat et al. | |
| 6,047,234 A | 4/2000 | Cherveny et al. | |
| 6,091,833 A * | 7/2000 | Yasui et al. | 382/104 |
| 6,201,883 B1 | 3/2001 | Mizui | |
| 6,526,352 B1 | 2/2003 | Breed et al. | |
| 6,608,913 B1 | 8/2003 | Hinton et al. | |
| 7,068,815 B2 | 6/2006 | Chang et al. | |
| 7,151,996 B2 | 12/2006 | Stein | |
| 7,202,776 B2 | 4/2007 | Breed | |

FOREIGN PATENT DOCUMENTS

WO    WO 99/60335    11/1999

OTHER PUBLICATIONS

U.S. Appl. No. 11/819,782, filed Jun. 29, 2007 with Applicant Kriel et al. (not yet published, but available in USPTO electronic image file wrapper).

* cited by examiner

*Primary Examiner*—Max Noori
(74) *Attorney, Agent, or Firm*—Finnegan, Henderson, Farabow, Garrett & Dunner (57) ABSTRACT

An automated lost load response system for work machines is disclosed. The response system has a first sensor situated to detect the contour of the road surface forward of a first machine, and a second sensor situated to detect the contour of the road surface rearward of the first machine. Each of the first and second sensors generates a signal corresponding to its detection of the contour of the road surface. The response system also has a controller that is in communication with both sensors. The controller is configured to provide a load loss warning based on the signals.

21 Claims, 9 Drawing Sheets

AUTOMATED LOST LOAD RESPONSE SYSTEM

TECHNICAL FIELD

The present disclosure relates generally to an automated load response system and, more particularly, to a system for automatically determining when a machine has lost a load, and then responding accordingly.

BACKGROUND

Machines such as, for example, on and off-highway haul trucks, railway cars, and other types of heavy equipment are used to perform a variety of tasks. Some of these tasks involve carrying large, awkward, loose, and/or heavy loads and, because of the size of the machines and/or poor visibility provided to operators of the machines, these tasks can be difficult to complete safely and effectively. In fact, it is not uncommon for part of the load to fall from the machine completely unnoticed by the operator. This problem can be exacerbated when the machine is remotely or autonomously controlled. A lost load can result in low productivity and efficiency, as well as potential obstruction and/or contamination of roadways, railways, or waterways. The lost load can also damage other machines and harm living organisms in the immediate vicinity.

One way to minimize the affect of a lost load may be to automatically detect a lost load in the path of an autonomous vehicle and then automatically reroute the autonomous vehicle around the lost load. An example of this strategy is described in U.S. Pat. No. 5,610,815 (the '815 patent) issued to Gudat et al. on Mar. 11, 1997. The '815 patent describes an autonomous vehicle equipped with a front mounted laser scanner and a vehicle positioning and navigation system. The laser scanner transmits an infra-red beam pulse in a known angular direction. The time for the beam to reflect off an object and return to the scanner is used to calculate the distance to the object in this angular direction from the scanner. An image comprising many pulses is represented by data pixels, each pixel having a range value and an angle value (cylindrical coordinates), both values associated with the object's location. The vehicle positioning and navigation system projects the vehicle's path into the plane of the image, and filters out pixels not in the vehicle's path. The remaining pixel data is transformed from cylindrical to Cartesian coordinates. Each transformed pixel has a road height value and a horizontal range value, both values associated with the object's location. This data is used to fit a curve to the height at the center of the road, the curve representing the expected road height value at each horizontal range value. When the actual road height values are sufficiently different from the expected road height values, the vehicle positioning and navigation system reroutes the vehicle to avoid the detected object, now classified as an obstacle.

Although the laser scanner of the '815 patent may detect a lost load in the path of an autonomous vehicle, it may do little to detect a load lost by the autonomous vehicle itself. Furthermore, though the vehicle positioning and navigation system of the '815 patent may identify a lost load, it may do little to identify damage to a road surface caused by a lost load. In addition, though the vehicle positioning and navigation system of the '815 patent may reroute the autonomous vehicle to avoid a lost load, it may provide little warning to other machines to avoid the geographical location of the lost load, or arrange for cleanup, salvage, or repair necessitated by the lost load.

The disclosed system is directed to overcoming one or more of the problems set forth above.

SUMMARY

In one aspect, the present disclosure is directed to an automated lost load response system for a first machine. The response system includes a first sensor situated to detect the contour of the road surface forward of the first machine, and a second sensor situated to detect the contour of the road surface rearward of the first machine. Each of the first and second sensors generates a signal corresponding to its detection of the contour of the road surface. The response system also includes a controller that is in communication with both sensors. The controller is configured to provide a load loss warning based on the signals.

In another aspect, the present disclosure is directed to a method of responding to a load lost from a first machine. The method includes detecting a contour of a road surface before and after the first machine passes over it. Additionally, the method includes detecting a difference between the contour of the road surface before and after the first machine passed over it. The method also includes providing a potential load loss warning based on the detection of a difference between the contours.

DETAILED DESCRIPTION

Figure 1:
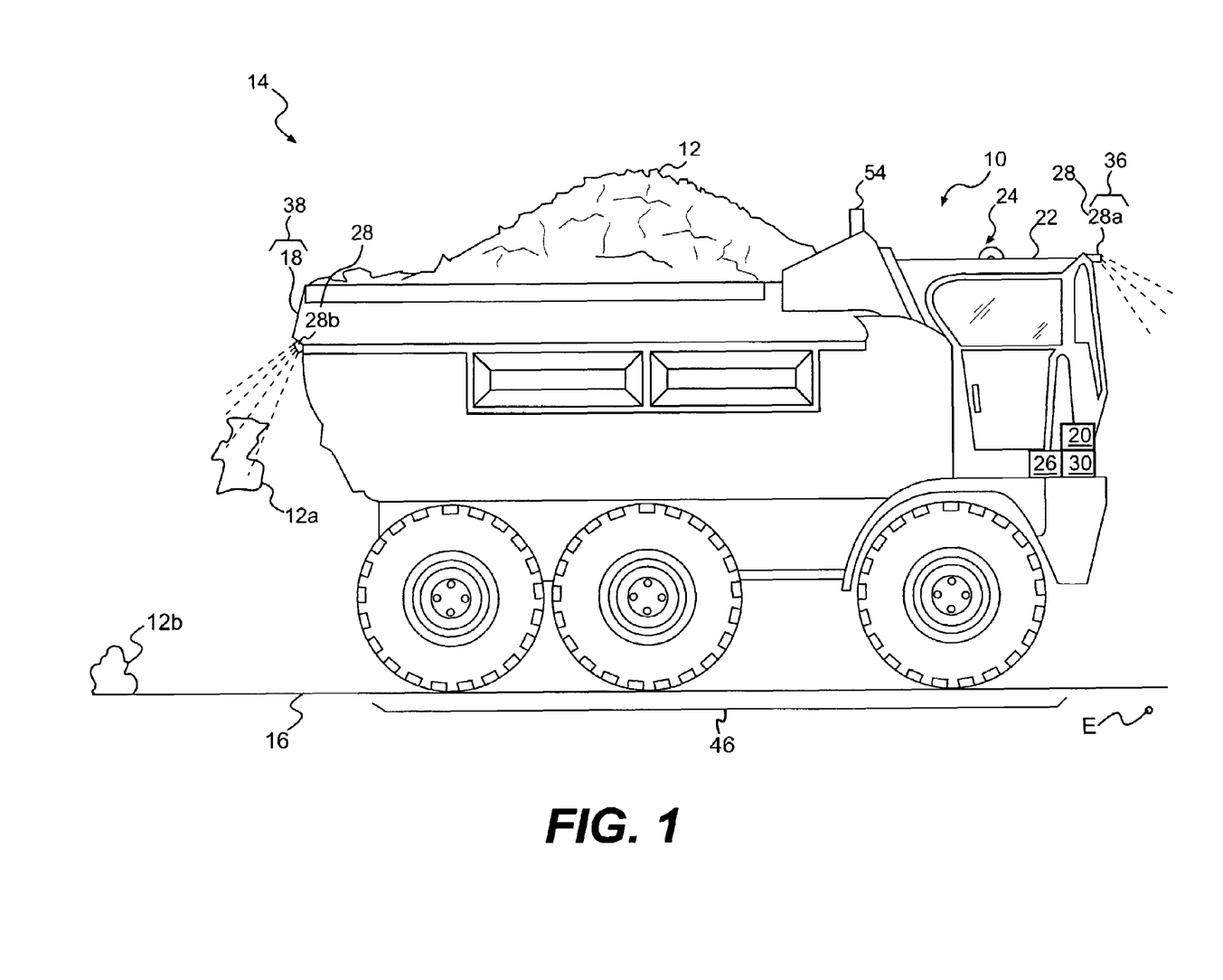
FIG. 1 is a pictorial illustration of an exemplary disclosed machine at an exemplary worksite.

FIG. 1 illustrates an exemplary machine 10 transporting a load material 12 through a worksite 14 on a road surface 16. Machine 10 may embody a mobile machine that performs some type of hauling operation associated with an industry such as mining, construction, farming, freighting, or another industry. For example, machine 10 may be an on or off-highway haul truck, a railway car, or another type of heavy equipment, which may haul load material 12.

Worksite 14 may be, for example, a mine site, a landfill, a quarry, a construction site, or another type of worksite known in the art. Road surface 16 may or may not embody a surface that machine 10 regularly traverses. For example, road surface 16 may be a gravel road, a quarry floor, a track bed, a concrete bridge, or another type of surface that machine 10 may traverse.

Load material 12 may embody a material that is large, awkward, loose, heavy, valuable, dangerous, or possesses another attribute making knowledge of its loss desirable. For example, load material 12 may be scrap, lumber, rock, ore, garbage, precious metal, or another similar material. As illustrated in FIG. 1, load material 12 may be supported and retained by a container 18 of machine 10; load material 12a may be falling from container 18; and load material 12b may have fallen from container 18 onto road surface 16.

Container 18 may embody any partially or fully enclosed structure temporarily or permanently attached to machine 10 that can be used to support and retain load material 12. For example, container 18 may be an open bed without sides, a flat-floor bed with one or more sides, a dual-slope bed with one or more sides, a van, a reefer, or another partially or fully enclosed structure, which may support and retain load material 12.

A controller 20 may be associated with machine 10 to gather information about load material 12 and/or road surface 16. Controller 20 may include means for monitoring, recording, storing, indexing, processing, and/or communicating information. These means may include, for example, a memory, one or more data storage devices, a central processing unit, and/or another component that may be used to run the disclosed applications. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 2:
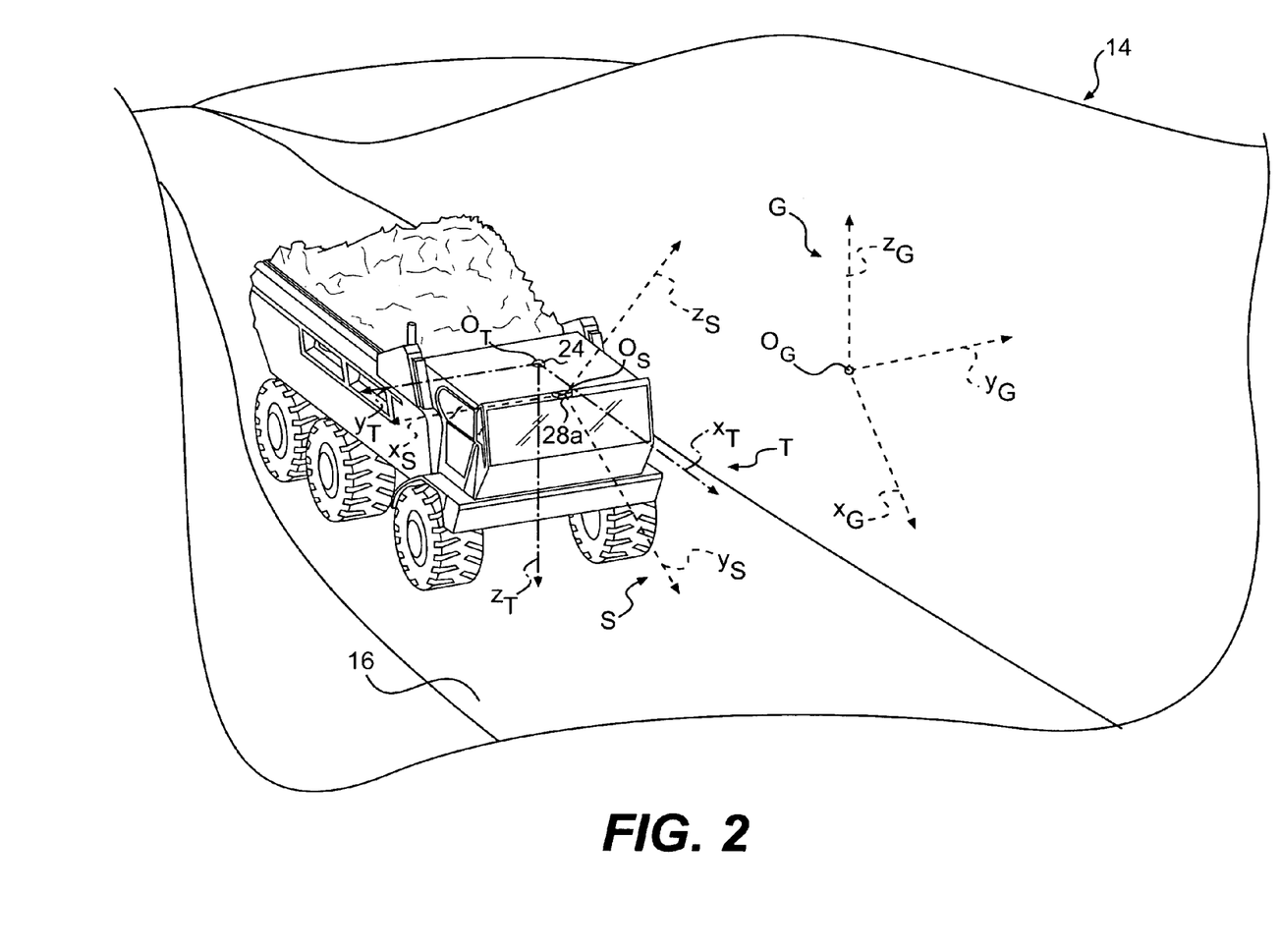
FIG. 2 is a pictorial illustration of exemplary coordinate systems for use with the machine of FIG. 1 at the worksite of FIG. 1.

Controller 20 may be attached to machine 10 and communicate with a pose device 24 to determine the geographical location and orientation of machine 10 relative to a fixed coordinate system G (referring to FIG. 2). Controller 20 may also communicate with a sensor 28 to determine the geographical location of points on road surface 16 relative to the sensor 28; and/or with a clock device 30 to determine the time location of the other determinations.

FIG. 2 illustrates coordinate system G, which may be fixedly located in worksite 14. Coordinate system G may be a right-handed 3-D Cartesian coordinate system having its origin at a point $O_G$, and having axis vectors $x_G$, $y_G$, and $z_G$. It is contemplated that axis vector $x_G$ may point to magnetic East, axis vector $y_G$ may point to magnetic North, and axis vector $z_G$ may point gravitationally upward. A point in coordinate system G may be referenced by its spatial coordinates in the form $X_G=[g_1\ g_2\ g_3]$, where from point $O_G$, $g_1$ is the distance along axis vector $x_G$, $g_2$ is the distance along axis vector $y_G$, and $g_3$ is the distance along axis vector $z_G$. An orientation with respect to coordinate system G may be referenced by its angular coordinates in the form $A_G=[g_4\ g_5\ g_6]$, where rotated about point $O_G$, $g_4$ is the pitch angle (i.e. rotation about axis vector $y_G$), $g_5$ is the yaw angle (i.e. rotation about axis vector $z_G$), and $g_6$ is the roll angle (i.e. rotation about axis vector $x_G$).

FIG. 2 also illustrates pose device 24, which may be attached to machine 10 and located at point $O_T$, the origin of a coordinate system T. Coordinate system T may be a right-handed 3-D Cartesian coordinate system having axis vectors $x_T$, $y_T$, and $z_T$. A point in coordinate system T may be referenced by its spatial coordinates in the form $X_T=[t_1\ t_2\ t_3]$, where from point $O_T$, $t_1$ is the distance along axis vector $x_T$, $t_2$ is the distance along axis vector $y_T$, and $t_3$ is the distance along axis vector $z_T$. An orientation with respect to coordinate system T may be referenced by its angular coordinates in the form $A_T=[t_4\ t_5\ t_6]$, where rotated about point $O_T$, $t_4$ is the pitch angle (i.e. rotation about axis vector $y_T$), $t_5$ is the yaw angle (i.e. rotation about axis vector $z_T$), and $t_6$ is the roll angle (i.e. rotation about axis vector $x_T$).

Pose device 24 may determine the geographical location of point $O_T$ and the orientation of coordinate system T (i.e. machine 10) relative to a local reference point, a coordinate system associated with worksite 14, a coordinate system associated with Earth, or another type of fixed 3-D coordinate system. Pose device 24 may include a locating device 31 (not shown) to determine the geographical location of point $O_T$ and an orientation device 32 (not shown) to determine the orientation of coordinate system T. Pose device 24 may also include a controller 34 (not shown) to filter and then communicate these determinations to controller 20.

Locating device 31 may receive and analyze high-frequency, low power radio or laser signals from multiple locations to triangulate a relative geographical location. For example, locating device 31 may embody an electronic receiver configured to communicate with one or more satellites, or a local radio or laser transmitting system to determine a relative 3-D geographical location of point $O_T$. Alternatively, locating device 31 may embody an Inertial Reference Unit (IRU), odometric or dead-reckoning positioning device, or another known locating device operable to receive or determine a relative 3-D geographical location of point $O_T$. Locating device 31 may communicate the geographical location of point $O_T$ to controller 34, which may filter the geographical location of point $O_T$ into spatial coordinates in coordinate system G.

Orientation device 32 may include laser-level sensors, tilt sensors, inclinometers, or other known devices operable to determine a relative pitch and a relative roll of coordinate system T. Orientation device 32 may also include a radio direction finder, a gyrocompass, a fluxgate compass, or another known device operable to determine a relative yaw of coordinate system T. Orientation device 32 may communicate the information regarding the pitch, roll, and yaw of coordinate system T to controller 34, which may filter the information into rotations about point $O_G$ in coordinate system G.

Controller 34 may include means for monitoring, recording, storing, indexing, processing, and/or communicating information. These means may include, for example, a memory, one or more data storage devices, a central processing unit, and/or another component that may filter information provided by locating device 31 and orientation device 32, and then communicate a signal indicative of this filtered information to controller 20. This signal may, for example, include the geographical location of point $O_T$ in spatial coordinates in coordinate system G: $X_G(O_T)=[-b_{T1}\ -b_{T2}\ -b_{T3}]$, where $O_T$ is the geographical location communicated by locating device 31. The signal may also include the rotations of coordinate system T about point $O_G$ in coordinate system G: $A_G(R_T)=[pt\ yt\ rt]$, where $R_T$ is the information communicated by orientation device 32.

Figure 3:
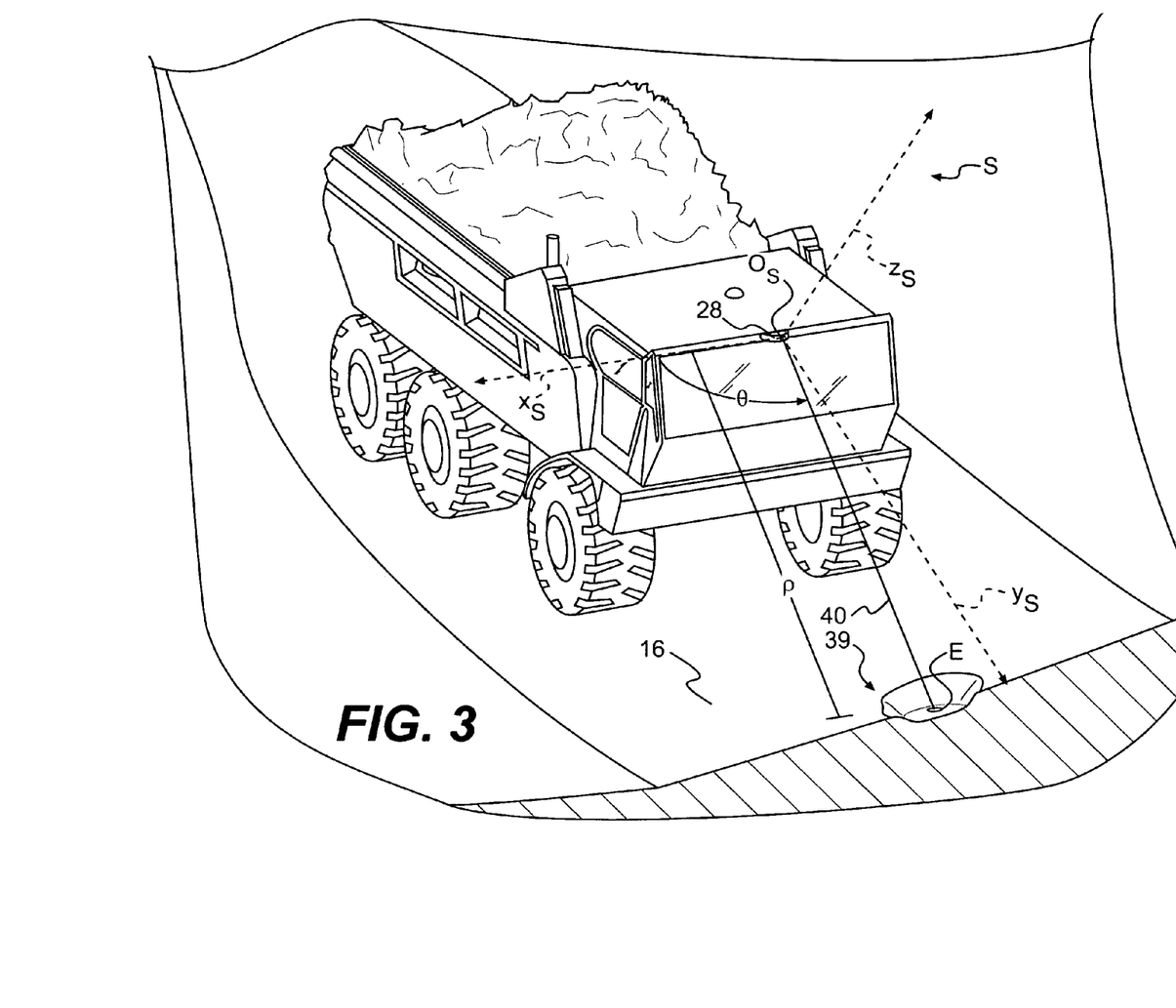
FIG. 3 is an enlarged pictorial illustration of the machine of FIG. 1 at the worksite of FIG. 1.

Additionally, FIG. 2 illustrates sensor 28a, which may be attached to front portion 36 (referring to FIG. 1) of cab 22 (referring to FIG. 1), or another surface of machine 10. Sensor 28a may be situated to scan road surface 16 forward of machine 10. Referring to FIG. 1, another sensor 28b may be attached to rear portion 38 of container 18, or another surface of machine 10. Sensor 28b may be situated to scan road surface 16 rearward of machine 10. Each sensor 28 may be located at a point $O_S$, the origin of a coordinate system S. Coordinate system S may be a right-handed 3-D Cartesian coordinate system having axis vectors $x_S$, $y_S$, and $z_S$. A point in coordinate system S may be referenced by its spatial coordinates in the Cartesian form $X_S=[s_1\ s_2\ s_3]$, where from point $O_S$, $s_1$ is the distance along axis vector $x_S$, $s_2$ is the distance along axis vector $y_S$, and $s_3$ is the distance along axis vector $z_S$. The geographical location of point $O_S$ and the orientation of coordinate system S relative to coordinate system T may be fixed and known. In particular, $X_T(O_S)$ may equal $[-b_{S1}-b_{S2}-b_{S3}]$, and $A_T(R_S)$ may equal [ps ys rs]. As illustrated in FIG. 3, the orientation of coordinate system S may provide a line of sight between sensor 28 and a concave portion 39 of road surface 16. A point in coordinate system S may alternatively be referenced by its spatial coordinates in the polar form $X_{SP}=[\rho\ \theta]$, where $\rho$ is the distance from point $O_S$ and $\theta$ is the polar angle from axis vector $x_S$.

As previously discussed, each sensor 28 may determine the geographical location of points on road surface 16 relative to itself. In particular, each sensor 28 may determine spatial coordinates in the form $X_{SP}=[\rho\ \theta]$ of points on road surface 16. For example, each sensor 28 may embody a LIDAR (light detection and ranging) device, a RADAR, (radio detection and ranging) device, a SONAR (sound navigation and ranging) device, or another type of device that may determine the range and direction to points on road surface 16. Sensor 28 may use a beam pulse to measure the distance between itself and a point E on road surface 16. The sensor 28 may have an emitter, which may emit a brief beam pulse 40. Sensor 28 may also have a receiver, which may receive the beam pulse 40. Sensor 28 may measure the time between the beam pulse 40 emission and reception. This measured time may be the time beam pulse 40 took to travel to, reflect off, and return from point E. Sensor 28 may convert the measured time into a distance. This distance may be spatial coordinate $\rho$. The beam pulse emission may be at an angle varied between 0 degrees and 180 degrees. This angle may be spatial coordinate $\theta$. Sensor 28 may communicate a signal including the geographical locations of several points E, each with different spatial coordinates $\theta$, to controller 20. For example, this signal may include the geographical locations of n points E in coordinate system S:

$$X_{SP} = \begin{bmatrix} \rho_1 & \theta_1 \\ \rho_2 & \theta_2 \\ \vdots & \vdots \\ \rho_n & \theta_n \end{bmatrix},$$

each row representing one point.

Referring to FIG. 2, clock device 30 may be attached to cab 22 of machine 10. As previously discussed, clock device 30 may determine the time location of other determinations. In particular, clock device 30 may periodically communicate a signal indicative of the current time location to other onboard devices. These onboard devices may append this time location to their determinations. The time location may be measured relative to Greenwich Mean Time, the Julian Day, or another type of time measuring system. For example, clock device 30 may embody a quartz oscillator, an electronic receiver configured to communicate with a clock system, or another device operable to receive or determine time location information.

Controller 20 may relate, by time location, the determinations of pose device 24 and each sensor 28. Controller 20 may then relate points E in coordinate system S to their locations in other coordinate systems. In particular, controller 20 may relate points E in coordinate system S in polar form to their locations in coordinate system S in Cartesian form. The relation between coordinate system S in polar form (i.e. $X_{SP}$) and coordinate system S in cartesian form (i.e. $X_S$) may be as follows:

$$X_S = \begin{bmatrix} \rho_1\cos\theta_1 & \rho_1\sin\theta_1 & 0 \\ \rho_2\cos\theta_2 & \rho_2\sin\theta_2 & 0 \\ \vdots & \vdots & \vdots \\ \rho_n\cos\theta_n & \rho_n\sin\theta_n & 0 \end{bmatrix},$$

where each row represents one point.

Controller 20 may further relate points E in coordinate system S in Cartesian form to their locations in coordinate system T. The relation between coordinate system S in Cartesian form and coordinate system T may be as follows:

$$X_T = \begin{bmatrix} [A_S X_{S1}^T + B_S]^T \\ [A_S X_{S2}^T + B_S]^T \\ \vdots \\ [A_S X_{Sn}^T + B_S]^T \end{bmatrix}, \text{ where:}$$

$X_{S1}$ is the first row of $X_S$, $X_{S2}$ is the second row of $X_S$, and $X_{Sn}$ is the nth row of $X_S$;

$A_S=A_{ys}A_{ps}A_{rs}$, and represents the rotational transform from coordinate system S in Cartesian form to coordinate system T, where:

$$A_{ys} = \begin{bmatrix} \cos ys & -\sin ys & 0 \\ \sin ys & \cos ys & 0 \\ 0 & 0 & 1 \end{bmatrix};$$

$$A_{ps} = \begin{bmatrix} \cos ps & 0 & -\sin ps \\ 0 & 1 & 0 \\ \sin ps & 0 & \cos ps \end{bmatrix}; \text{ and}$$

$$A_{rs} = \begin{bmatrix} 1 & 0 & 0 \\ 0 & \cos rs & -\sin rs \\ 0 & \sin rs & \cos rs \end{bmatrix}; \text{ and}$$

$$B_S = \begin{bmatrix} b_{S1} \\ b_{S2} \\ b_{S3} \end{bmatrix},$$

and represents the translational transform from coordinate system S in Cartesian form to coordinate system T.

Controller 20 may further relate points E in coordinate system T to their locations in coordinate system G. The relation between coordinate system T and coordinate system G may be as follows:

$$X_G = \begin{bmatrix} [A_T X_{T1}^T + B_T]^T \\ [A_T X_{T2}^T + B_T]^T \\ \vdots \\ [A_T X_{Tn}^T + B_T]^T \end{bmatrix}, \text{ where:}$$

$X_{T1}$ is the first row of $X_T$, $X_{T2}$ is the second row of $X_T$, and $X_{Tn}$ is the nth row of $X_T$;

$A_T = A_{yt} A_{pt} A_{rt}$, and represents the rotational transform from coordinate system T to coordinate system G, where:

$$A_{yt} = \begin{bmatrix} \cos yt & -\sin yt & 0 \\ \sin yt & \cos yt & 0 \\ 0 & 0 & 1 \end{bmatrix};$$

$$A_{pt} = \begin{bmatrix} \cos pt & 0 & -\sin pt \\ 0 & 1 & 0 \\ \sin pt & 0 & \cos pt \end{bmatrix}; \text{ and}$$

$$A_{rt} = \begin{bmatrix} 1 & 0 & 0 \\ 0 & \cos rt & -\sin rt \\ 0 & \sin rt & \cos rt \end{bmatrix}; \text{ and}$$

$$B_T = \begin{bmatrix} b_{T1} \\ b_{T2} \\ b_{T3} \end{bmatrix},$$

and represents the translational transform from coordinate system T to coordinate system G.

Figure 4:
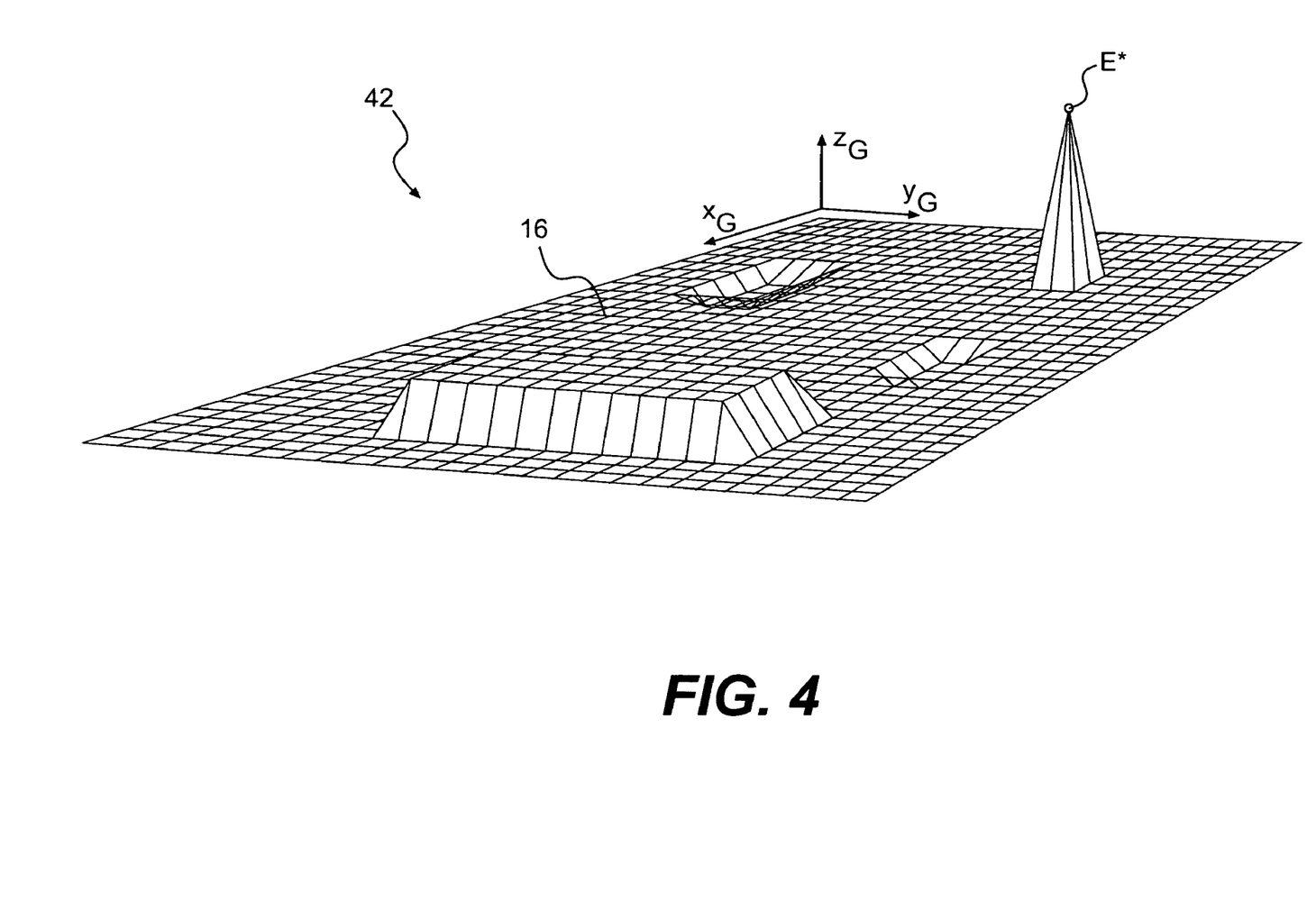
FIG. 4 is a graphical illustration of an exemplary road surface of the worksite of FIG. 1 as scanned by the machine of FIG. 1.

Controller 20 may temporarily store the coordinate system G location of points E in a map 42 (referring to FIG. 4). Map 42, electronic in form, may be stored in the memory of controller 20. Map 42 may be updated in real time to reflect the locations of points on road surface 16 as they are scanned by sensor 28. FIG. 4 is a graphical illustration of points on road surface 16 at time T, as they may be stored in map 42. It is contemplated that some of these points may not actually represent road surface 16, but may instead represent load material 12*a* or noise. One of these points may be an extraneous point E*.

Figure 5:
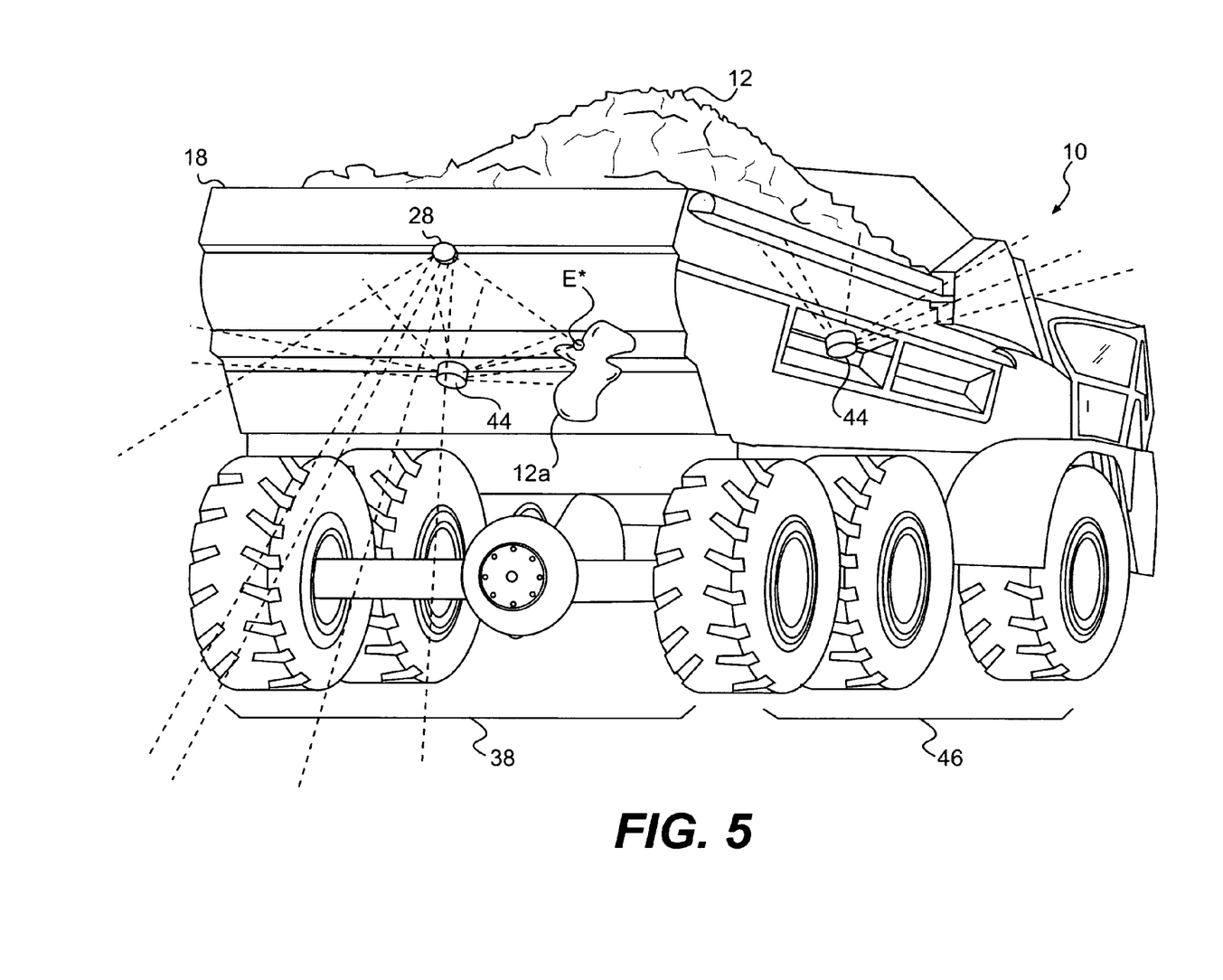
FIG. 5 is a pictorial illustration of an exemplary load material falling from the machine of FIG. 1.

Controller 20 may filter extraneous point E* out of map 42 using a height ($g_3$ coordinate) threshold. A straight height threshold may be meaningless since road surface 16 is not necessarily flat. Hence, the threshold may be referenced against the expected height, as predicted by third order fits along vectors parallel to axis vectors $x_G$ and $y_G$, at the $g_1$ and $g_2$ coordinates, respectively, of each point. In this manner, points on a hill of road surface 16 may be retained in map 42 since the actual height and the height expectation, as predicted by the third order fits should match very closely. But, extraneous point E* may be removed from map 42, and replaced by the height expectation, since its actual height may barely reflect the height expectation, as predicted by the third order fits. FIG. 5 illustrates extraneous point E* as being on load material 12*a*. Controller 20 may use a sensor 44 to filter this extraneous point E* out of map 42.

One or more sensors 44 may be attached to machine 10 and situated to detect material falling from container 18. Sensor 44 may be attached to a side 46 of container 18, a rear portion 38 of container 18, or another surface of container 18 or machine 10, to detect material falling from container 18. Each sensor 44 may embody a device that detects and ranges objects. For example, sensor 44 may be a LIDAR (light detection and ranging) device, RADAR (radio detection and ranging) device, SONAR (sound navigation and ranging) device, or another type of device which may detect and range objects.

Each sensor 44 may include an emitter, which may emit a detection beam, and a receiver, which may receive the detection beam. The emitter may vary the direction of the emitted detection beam so it repeatedly traverses a set of predetermined angles forming a field of detection. The receiver may locate the angle and range the distance of objects within the field by analyzing the angle and time at which it receives detection beams. Sensor 44 may then generate a signal corresponding to the detection and location of objects within the field of detection, which sensor 44 may communicate to controller 20.

Controller 20 may receive the signal from sensor 44 and analyze it to determine the presence of unexpected objects. Specifically, controller 20 may convert the signal generated by sensor 44 into a function (hereafter "the generated function") representing the location of surface points of objects on or near machine 10 at regular time intervals. Controller 20 may automatically compare the generated function to a stored function representing the location of expected surface points, for example, the sides of container 18 or another part of machine 10. By this comparison (hereafter "the comparison of functions"), controller 20 may determine the presence of an unexpected object when the functions are not equivalent. For example, the unexpected object might be load material 12*a*, an open door, or an improperly located machine 10 part.

Controller 20 may further analyze the comparison of functions to determine additional information about the unexpected object. Where the two functions are not equivalent, the generated function may represent the location of points above (not on) road surface 16 at time τ. Controller 20 may compare these points to points stored in map 42. A point that is sensed by both sensors 28 and 44 may be an extraneous point E*. Therefore, controller 20 may remove the extraneous point E* from map 42, and replace it with the height expectation, as predicted by the third order fits.

Figure 6:
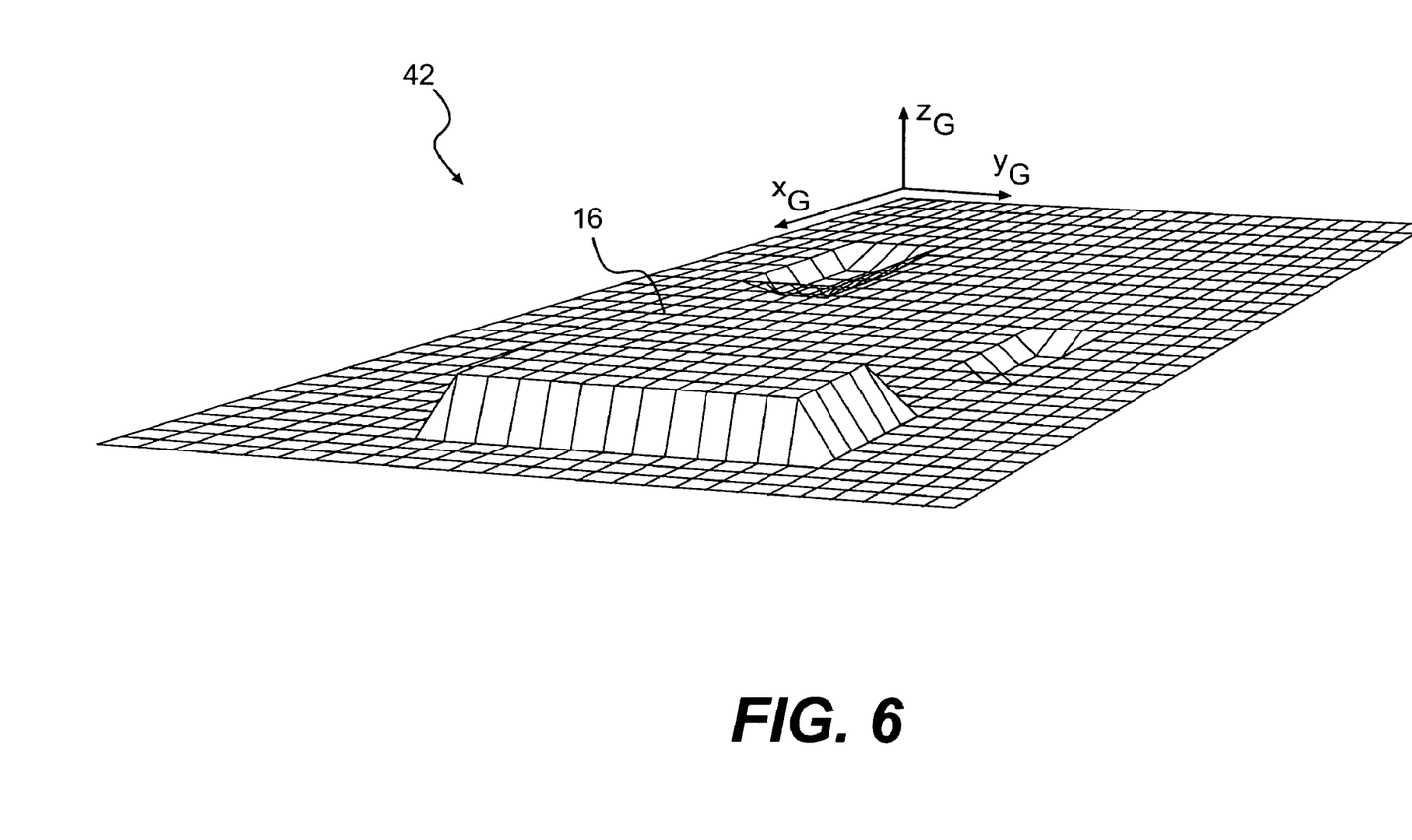
FIG. 6 is a graphical illustration of the road surface of FIG. 4, as refined by the machine of FIG. 1.

FIG. 6 is a graphical illustration of points on road surface 16 at time τ as they may be stored in map 42, after load material 12 and any noise have been filtered out. Controller 20 may compare these points to points previously known to be on road surface 16. Specifically, controller 20 may compare the heights of points stored in map 42 to the heights of points stored in a second map 48 (referring to FIG. 7).

Figure 7:
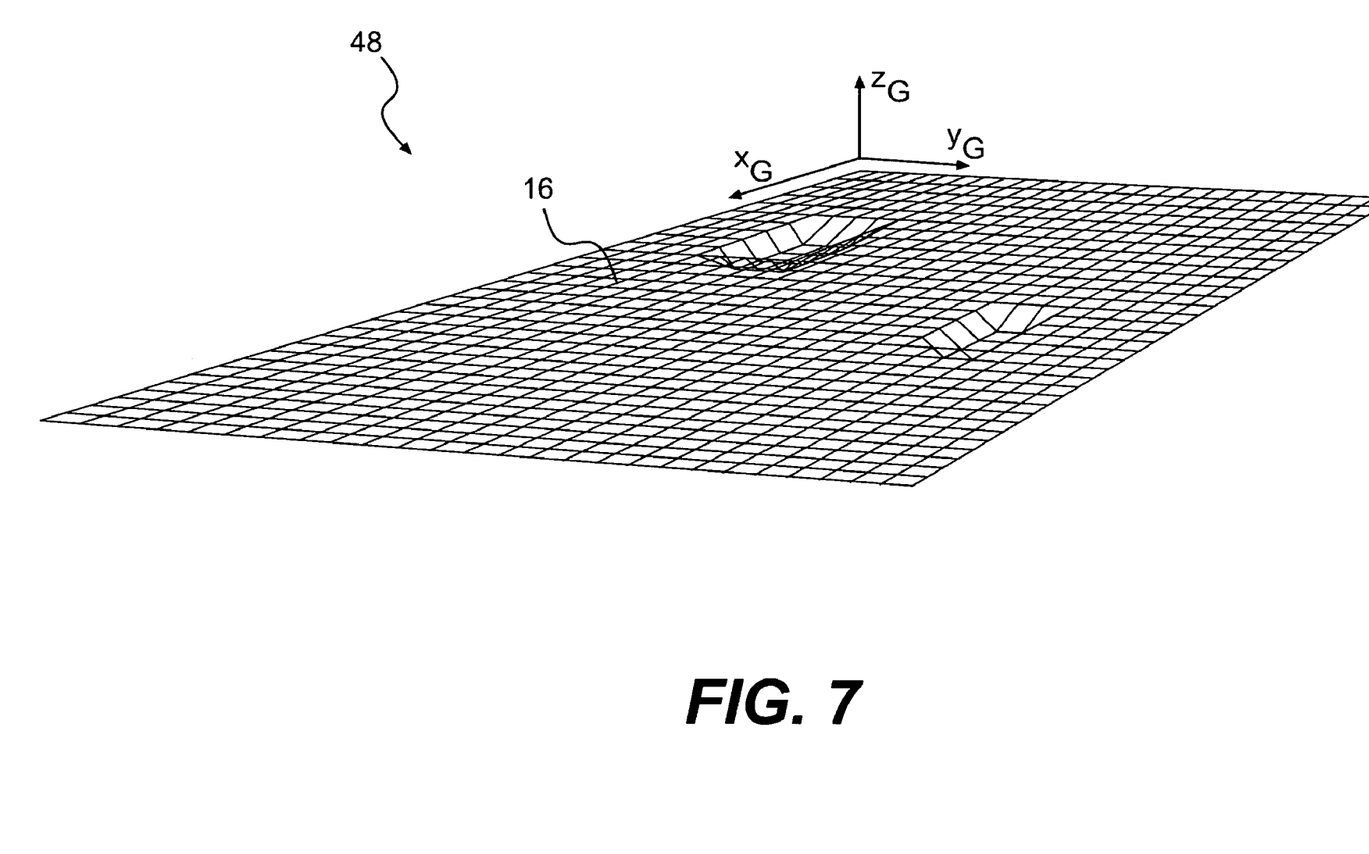
FIG. 7 is a graphical illustration of the road surface of FIG. 6 at a time before the machine of FIG. 1 scanned the road surface of FIG. 4.

Map 48, electronic in form, may be stored in the memory of controller 20. Map 48 may be updated in real time to reflect the geographical and time locations of points on road surface 16. It may also be used to reroute machine 10 or another machine to avoid a potentially hazardous area of road surface 16. Alternatively, map 48 may be stored in an offboard system, which may be continually referenced and updated by any machine functioning within a certain geographical area (i.e. within worksite 14). FIG. 7 is a graphical illustration of points on road surface 16 at a time $\tau_0$ (prior to time τ), as they may be stored in map 48.

Figure 8:
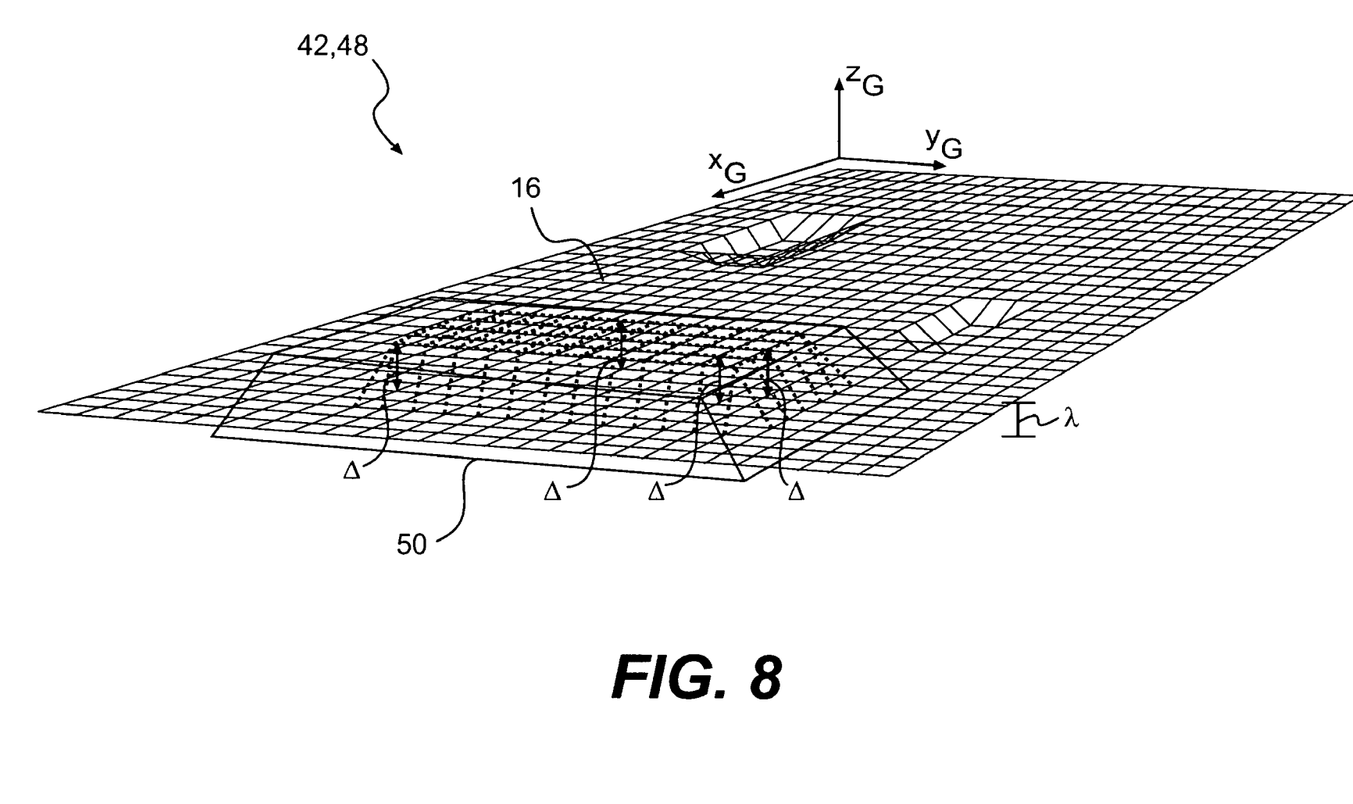
FIG. 8 is a graphical illustration of the differences between the road surface of FIG. 6 and the road surface of FIG. 7.

FIG. 8 is a graphical illustration of the height differences "Δ" between map 48 and map 42 at each $g_1$-$g_2$ coordinate pair. Each height difference Δ may or may not warrant further analysis by controller 20. In particular, height differences Δ that are smaller in magnitude than a height "λ" may be immediately incorporated into map 48. Specifically, controller 20 may replace each map 48 point associated with a height difference smaller in magnitude than height λ with its corresponding map 42 point, thereby updating map 48 to reflect road surface 16 at time τ. But, height differences Δ that are greater in magnitude than height λ may be further analyzed by controller 20 to first determine whether they are potentially hazardous to a machine (hereafter "potentially hazardous") and, if they are potentially hazardous, then determine their cause.

Controller 20 may determine one set 50 of height differences is potentially hazardous by analyzing the points, which are in the area of set 50, on road surface 16 stored in map 42. In particular, controller 20 may calculate the gradient of the gradient at points on road surface 16. If the magnitude of this gradient of the gradient exceeds a certain established value at a certain established number of nearby points, set 50 may be deemed potentially hazardous. Furthermore, if the direction of the gradient of the gradient has a component opposite to the direction of axis vector $z_G$, set 50 may be categorized as an obstruction to road surface 16. Otherwise set 50 may be categorized as concave damage to road surface 16. Alternatively, controller 20 may calculate the size of set 50 by integrating the height differences $\Delta$ over the $g_1$ and $g_2$ boundaries of set 50. This size may represent an amount of load material 12 lost by machine 10 between time $\tau_0$ and time $\tau$. If the amount exceeds a certain established value, set 50 may be deemed potentially hazardous.

Figure 9:
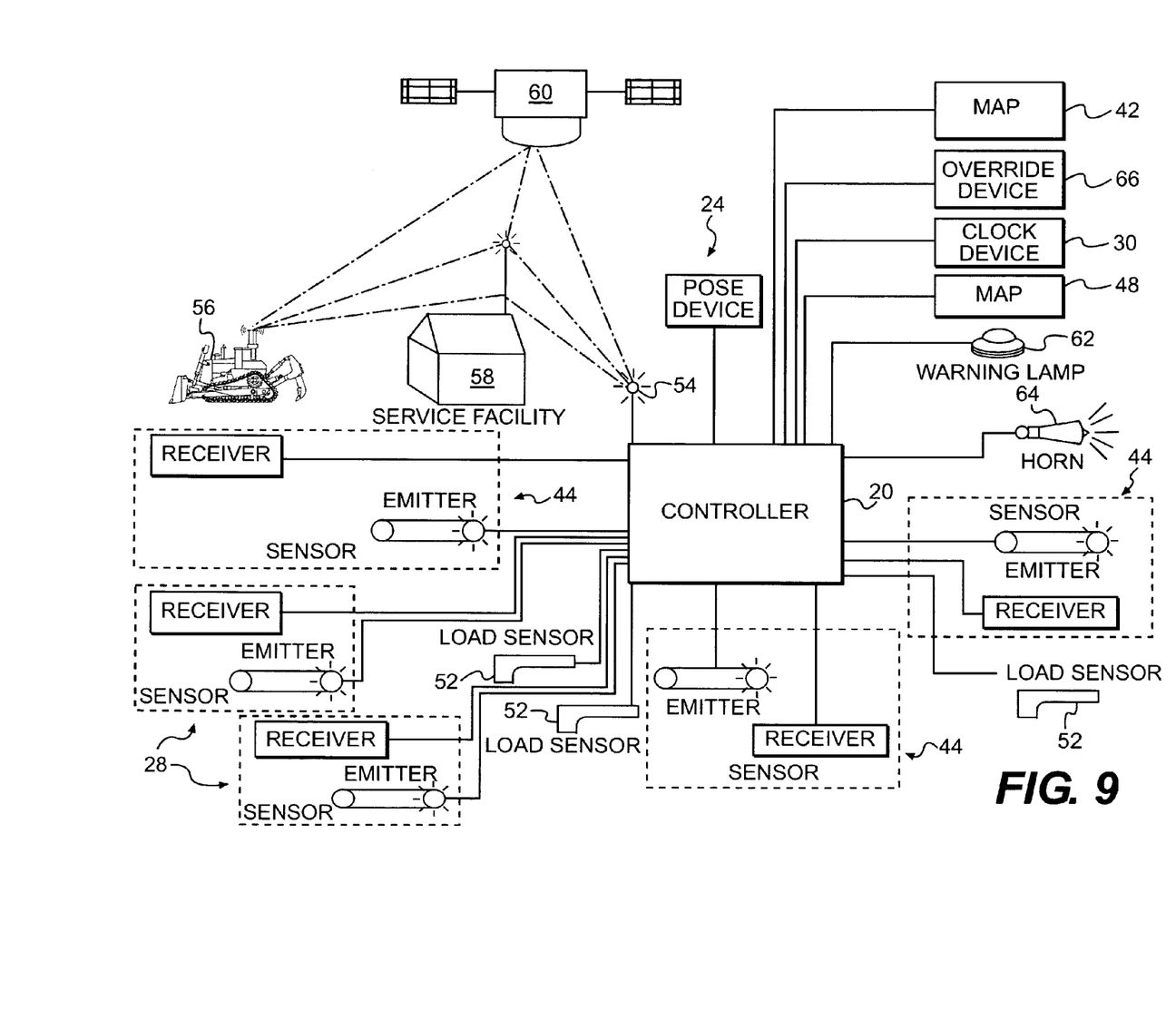
FIG. 9 is a diagrammatic illustration of an exemplary disclosed control system for use with the machine of FIG. 1.

Controller 20 may determine and respond to the cause of set 50 by interacting with additional devices illustrated in FIG. 9. In particular, controller 20 may use one or more load sensors 52 to determine whether machine 10 lost any load material 12 between time $\tau_0$ and time $\tau$. Each load sensor 52 may embody a load cell, a force gauge, a pressure sensor, or another sensor operable to determine the amount of material container 18 is retaining. The load sensors 52 may be attached to machine 10 between the frame of machine 10 and container 18 to account for possible shifting of load material 12 within container 18. The aggregate load weight measured by all load sensors 52 may then be converted to a signal indicative of the amount of remaining load material 12. This signal may then be communicated from load sensors 52 to controller 20. Controller 20 may then subtract the amount of load material 12 at time $\tau$ from a stored amount of load material 12 at time $\tau_0$, the difference representing the weight of load material 12b, which may be the cause of set 50. It is contemplated that the calculated weight of load material 12b may be zero. If this is the case, set 50 may have another cause such as, for example, a land slide, a snow drift, or a defective road surface.

Controller 20 may activate warning devices and transmit data to other machines and/or systems based on the determination of the cause of set 50. For example, a transmission device 54 may be used to transmit a warning of a potential lost load to another machine, or a request for maintenance to service facility 58; an operator warning device 62 may be activated to warn an operator of a potential lost load; or an external warning device 64 may be activated to warn machine 10's immediate vicinity of a potential lost load.

Transmission device 54 may be associated with controller 20 to transmit and/or receive data, warnings, and/or instructions through a communications link to another machine 56, a service facility 58, a satellite 60, or another offboard system, based on the signals generated by sensor 28, pose device 24, clock device 30, load sensor 52, sensor 44, and/or another onboard and/or offboard device. Transmission device 54 may include hardware and/or software that enables transmission device 54 to send and/or receive data messages through a communication link. The communications may include satellite, cellular, infrared, radio, and/or other types of wireless communication that enable transmission device 54 to wirelessly exchange information with offboard systems. Alternatively, the communications may include electrical, optical, and/or other types of wired communication that enable transmission device 54 to exchange information with offboard systems.

An operator warning device 62 may be associated with controller 20 and situated to alert a machine operator of load material 12b. Means of alert may include generating sound, light, smell, or another change to working conditions detectable by a machine operator. For example, operator warning device 62 may embody a warning lamp; alarm; horn; head-up display; odorant or tissue-irritating substance dispenser; or another device operable to warn a machine operator of load material 12b.

An external warning device 64 may, alternatively or additionally, be associated with controller 20 and situated to alert the immediate vicinity of machine 10 to load material 12b. Means of alert may include generating sound, light, smell, or another change to environment detectable by living things. For example, external warning device 64 may embody a warning lamp, alarm, horn, chemical repellent dispenser, or another device operable to warn a living thing of load material 12b.

An override device 66 may be associated with controller 20 and situated to provide a machine operator a means of interfacing with the automated lost load response system, allowing alterations to the system's function. For example, override device 66 may embody a foot pedal, joystick controller, lever, switch, button, wheel, or another interface device known in the art, and it may be used to disable, enable, or otherwise alter the functioning of the automated lost load response system.

INDUSTRIAL APPLICABILITY

The disclosed system may be useful for tasks involving the transportation of large, awkward, loose, and/or heavy loads. The system may detect information about a load material and/or a road surface, and transmit and/or report this information to interested persons and/or other systems. In particular, the disclosed system may be used to detect when material is lost from a container and warn another machine of the loss.

The disclosed system may, based on the signal generated by a sensor 28, the signal generated by pose device 24, the signal generated by clock device 30, and the processing of controller 20, determine the locations of points on road surface 16. Controller 20 may temporarily store these points in map 42. Controller 20 may then filter extraneous points out of map 42 using a height threshold. Alternatively, controller 20 may use a sensor 44 to determine which points stored in map 42 may represent points above (not on) road surface 16. In particular, controller 20 may generate a function representing the location of surface points of objects on or near machine 10. Controller 20 may automatically compare this generated function to a stored function corresponding to expected surface points, for example, container 18, or another part of machine 10. By this comparison, controller 20 may determine the presence of an unexpected object, for example, a load material 12a, an open door, or an improperly located machine 10 part. Controller 20 may filter points on this object out of map 42.

Controller 20 may compare the filtered map 42 to map 48, which permanently stores the locations of points on road surface 16. By this comparison, controller 20 may automatically determine which points in map 42 represent significant changes to the contours of road surface 16 (hereafter "changes"). By analyzing the gradient of the gradient at these points, controller 20 may automatically determine which contours of road surface 16 may be potentially hazardous to a machine 10. Alternatively, controller 20 may automatically determine which contours of road surface 16 may be potentially hazardous to a machine 10 by analyzing the volume changes at the points. Controller 20 may then store or buffer in preparation for transmission the locations of the contours of road surface 16 that may be potentially hazardous to a machine 10.

The disclosed system may also determine additional information about the changes. In particular, controller 20 may determine whether the changes represent load material 12b, damage to road surface 16 caused by load material 12a, or some other change that may be unrelated to load materials 12a and 12b. These determinations may aid controller 20, service facility 58, or another system, or person in efficiently and appropriately handling the changes. For example, the determinations may lead controller 20 to notify service facility 58 or another machine 56 of the location and amount of lost load material 12b; transmit a machine 10 or road surface 16 maintenance request to service facility 58; or notify an operator and/or other interested person to inspect and/or act upon machine 10 in some way.

The disclosed system may interface with additional onboard or offboard sensors to determine the additional information. For example, controller 20 may, based on the signal generated by load sensor 52, and the time of the changes, determine whether the changes represent load material 12b, damage to road surface 16 caused by load material 12a, or some other change that may be unrelated to load materials 12a and 12b. If there is a change in the weight of container 18 (filled with load material 12), then controller 20 may determine that a portion of load material 12 has been lost. Controller 20 may determine that because a portion of load material 12 has been lost, the changes may represent load material 12b or damage to road surface 16 caused by load material 12a, and record or buffer this information in preparation for transmission. Additionally, based on the signal generated by load sensor 52, controller 20 may determine and then store or buffer in preparation for transmission the weight of the load material lost. But, if there is no change in the weight of container 18 (filled with load material 12), then controller 20 may determine that the changes may be unrelated to load materials 12a and 12b, and then store or buffer this determination in preparation for transmission.

Controller 20 may also interface with other onboard or offboard systems to determine the additional information. For example, controller 20 may correlate the changes with information regarding weather, machine diagnostic data, operator maintained data regarding qualities of the transported load material 12, images of the changes, or other desirable information. This correlated information may be stored and buffered in preparation for transmission.

The disclosed system may use transmission device 54 to transmit to offboard systems the information that controller 20 has stored or buffered in preparation for transmission. Alternatively, based on the information that controller 20 has stored or buffered in preparation for transmission, controller 20 may activate operator warning device 62 and/or external warning device 64.

Sometimes, it may be necessary to disable the disclosed system, for example, to load or unload machine 10. Therefore, based on a signal generated by override device 66, controller 20 may temporarily prevent transmission of maintenance requests and activation of warning devices. Alternatively, based on information from other onboard or offboard systems, controller 20 may, without interfacing with an operator, temporarily prevent transmission of maintenance requests and activation of warning devices.

As previously discussed, the disclosed system may detect load material 12b. In particular, sensor 28b may detect load material 12b located rearward of machine 10. Though this detection may not necessitate rerouting of machine 10, it may aid controller 20, service facility 58, or another system, or a person in efficiently and appropriately handling load material 12b. Specifically, another machine 56 may be rerouted to avoid load material 12b.

Additionally, the disclosed system may detect damage to road surface 16 caused by load material 12a. In particular, sensor 28b may be oriented so as to enable a beam pulse emission to reflect off a point on concave portion 39 of road surface 16. Controller 20 may determine that concave portion 39 of road surface 16 represents changes to contours of road surface 16. Controller 20 may then use load sensors 52 to determine load material 12a was lost just before the changes to the contours of road surface 16 were detected. This determination may aid controller 20, service facility 58, another system, or a person in efficiently and appropriately handling load material 12a.

The disclosed system may transmit information about load materials 12a and/or 12b to a service facility 58, which may then arrange for cleanup, salvage, or repair necessitated by the lost load. Furthermore, the system's constant monitoring of potential lost loads and its ability to warn other machines, and the machine 10's immediate vicinity, of load material 12a, may allow machines and/or persons to avoid the geographical location of the lost load, thus preventing possible serious damage and/or injury.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A load response system for a first machine, comprising:
    a first sensor situated to detect the contour of a road surface forward of the first machine and generate a corresponding first signal;
    a second sensor situated to detect the contour of the road surface rearward of the first machine and generate a corresponding second signal; and
    a controller in communication with the first and second sensors and configured to provide a potential load loss warning based on the first and second signals.

2. The load response system of claim 1, wherein the controller is further configured to determine whether a potential loss of load is potentially hazardous to at least one of the first machine and a second machine.

3. The load response system of claim 2, further including a locating device configured to determine a geographical location of the first machine, wherein the controller is in further communication with the locating device and configured to relate the potential loss of the load to the geographical location at the time of the potential loss.

4. The load response system of claim 2, wherein the controller is configured to calculate an amount of load material potentially lost based on the first and second signals.

5. The load response system of claim 4, further including at least one load sensor configured to generate a load signal indicative of the amount of load material within a container, wherein the controller is in further communication with the load sensor and the amount of load material potentially lost is calculated based further on the load signal.

6. The load response system of claim 2, further including a transmission device, wherein the controller is in further communication with the transmission device and configured to transmit a potential load loss warning to the second machine, in response to a determination that the potential loss of the load is potentially hazardous to the second machine.

7. The load response system of claim 2, further including a transmission device, wherein the controller is in further communication with the transmission device and configured to transmit a maintenance request to a service facility, in response to a determination that the potential loss of the load is potentially hazardous to at least one of the first machine and the second machine.

8. The load response system of claim 7, wherein the maintenance request is based on a potential obstruction to the roadway.

9. The load response system of claim 7, wherein the maintenance request is based on potential damage to the road surface.

10. The load response system of claim 2, further including a third sensor situated to detect material that is lost from a container and generate a corresponding third signal, wherein the controller is in further communication with the third sensor and configured to, based on the third signal, refine at least one of the detected contour of the road surface forward of the first machine and the detected contour of the road surface rearward of the first machine.

11. The load response system of claim 1, wherein the first and second sensors each include:
    an emitter to emit a beam; and
    a receiver situated to receive the beam and generate a corresponding signal.

12. The load response system of claim 11, wherein each of the first and second sensors is configured to detect the contour of both concave and convex portions of the road surface.

13. The load response system of claim 1, further including an override device configured to generate an intent signal indicative of purposeful alterations to an amount of load material retained by a container, wherein the controller is in further communication with the override device and configured to prevent transmissions to offboard systems in response to the intent signal.

14. A method of responding to a load lost from a first machine, comprising:
    detecting the contour of a road surface before and after the first machine passes over it;
    detecting a difference between the contour of the road surface before and after the first machine passed over it; and
    providing a potential load loss warning based on the detection of the difference between the contours.

15. The method of claim 14, further including relating the potential loss of the load to the geographical location of the first machine at the time of the potential loss.

16. The method of claim 15, further including determining a geographical location where the load is lost.

17. The method of claim 15, further including calculating an amount of the load lost.

18. The method of claim 15, further including transmitting, in response to a determination that a load loss is potentially hazardous, at least one of:
    a potential load loss warning to a second machine;
    a potential load loss warning to a machine operator; and
    a maintenance request to a service facility.

19. The method of claim 18, further including:
    emitting a detection beam;
    detecting an irregular reflection of the detection beam;
    determining load material is potentially falling from the first machine based on a detection of the irregular reflection of the detection beam; and
    refining at least one of the detected contour of the road surface before and after the first machine passes over it.

20. A machine, comprising:
    a power source;
    a container;
    a frame operatively supporting the power source and the container;
    a first sensor situated to detect the contour of a road surface forward of the machine and generate a corresponding first signal;
    a second sensor situated to detect the contour of the road surface rearward of the machine and generate a corresponding second signal; and
    a controller in communication with the machine and the first and second sensors, the controller configured to provide a potential load loss warning based on the first and second signals.

21. The machine of claim 20, further including a third sensor situated to detect material that is lost from the container and configured to generate a corresponding third signal, the controller being in further communication with the third sensor, and configured to refine at least one of the detected contour of the road surface forward of the machine and the detected contour of the road surface rearward of the machine, based on the third signal.

* * * * *

UNITED STATES PATENT AND TRADEMARK OFFICE
CERTIFICATE OF CORRECTION

PATENT NO. : 7,594,441 B2  Page 1 of 1
APPLICATION NO. : 11/905042
DATED : September 29, 2009
INVENTOR(S) : Gudat et al.

It is certified that error appears in the above-identified patent and that said Letters Patent is hereby corrected as shown below:

Please correct the Specification as follows:
Column 8, line 58, delete "A" and insert -- Δ --.

Signed and Sealed this

Thirteenth Day of April, 2010

David J. Kappos
*Director of the United States Patent and Trademark Office*